United States Patent
Bohannon (10) Patent No.: US 10,540,042 B2
(45) Date of Patent: Jan. 21, 2020

(54) IMPEDANCE RATIO-BASED CURRENT CONVEYOR

(71) Applicant: Synaptics Incorporated, San Jose, CA (US)

(72) Inventor: Eric Bohannon, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 39 days.

(21) Appl. No.: 15/729,496

(22) Filed: Oct. 10, 2017

(65) Prior Publication Data

US 2019/0107917 A1  Apr. 11, 2019

(51) Int. Cl.
*G06F 3/041* (2006.01)
*G06F 3/044* (2006.01)
*G06K 9/00* (2006.01)

(52) U.S. Cl.
CPC ........... *G06F 3/0418* (2013.01); *G06F 3/044* (2013.01); *G06F 2203/04101* (2013.01); *G06K 9/0002* (2013.01)

(58) Field of Classification Search
CPC ......... G06F 2203/04101; G06F 3/0418; G06F 3/044
See application file for complete search history.

(56) References Cited

U.S. PATENT DOCUMENTS

| | | | |
|---|---|---|---|
| 2015/0214897 A1* | 7/2015 | Motamed | H03F 1/223 330/257 |
| 2015/0268760 A1* | 9/2015 | Park | G06F 3/044 345/174 |
| 2019/0102037 A1* | 4/2019 | Krah | G06F 3/0416 |

* cited by examiner

*Primary Examiner* — Chun-Nan Lin
(74) *Attorney, Agent, or Firm* — Ferguson Braswell Fraser Kubasta PC (57) ABSTRACT

An input device associated with a sensing region is disclosed. The input device includes: a first sensor electrode associated with the sensing region and configured to propagate a resulting signal; an first auxiliary component configured to generate an output using a scaled signal; and a first impedance ratio-based current conveyor coupled to the first sensor electrode and including: a staging circuit configured to generate an input signal using the resulting signal and a ratio of a first impedance to a second impedance; and a set of current mirrors configured to generate the scaled signal from the input signal.

20 Claims, 5 Drawing Sheets

IMPEDANCE RATIO-BASED CURRENT CONVEYOR

TECHNICAL FIELD

The described embodiments relate generally to electronic devices, and more specifically, to impedance ratio-based current conveyors used to process and convey (e.g., to other processing stages) a resulting signal associated with a sensor electrode and sensing region.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

A touch sensor may have a large background capacitance. As background capacitance increases, it becomes increasing difficult for the circuits that process touch sensor signals to maintain linearity. Further, the auxiliary circuits used to offset (e.g., reduce, cancel, etc.) large sensor background capacitance often contribute towards device noise. Regardless, interfaces with touch sensors remain popular.

SUMMARY

In general, in one aspect, one or more embodiments relate to an input device associated with a sensing region. The input device comprises: a first sensor electrode associated with the sensing region and configured to propagate a resulting signal; an first auxiliary component configured to generate an output using a scaled signal; and a first impedance ratio-based current conveyor coupled to the first sensor electrode and comprising: a staging circuit configured to generate an input signal using the resulting signal and a ratio of a first impedance to a second impedance; and a set of current mirrors configured to generate the scaled signal from the input signal.

In general, in one aspect, one or more embodiments relate to a method for operating an input device associated with a sensing region. The method comprises: propagating, through a sensor electrode associated with the sensing region, a resulting signal; generating, by a staging circuit of an impedance ratio-based current conveyor, an input signal using the resulting signal and a ratio of a first impedance to a second impedance; generating, by a set of current mirrors of the impedance ratio-based current conveyor, a scaled signal using the input signal; and generating, by an auxiliary component, an output using the scaled signal.

In general, in one aspect, the invention relates to an processing system for an input device associated with a sensing region. The processing system comprises: sensor circuitry configured to: propagate, through a sensor electrode associated with the sensing region, a resulting signal; generate, by a staging circuit of an impedance ratio-based current conveyor, an input signal using the resulting signal and a ratio of a first impedance to a second impedance; generate, by a set of current mirrors of the impedance ratio-based current conveyor, a scaled signal using the input signal; and generate, by an auxiliary component, an output using the scaled signal; and determination circuitry configured to: determine a presence of an input object in the sensing region using the output.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments disclose input devices and methods that facilitate improved usability. Specifically, one or more embodiments disclose impedance ratio-based current conveyors that reduce interference and device noise.

Figure 1:
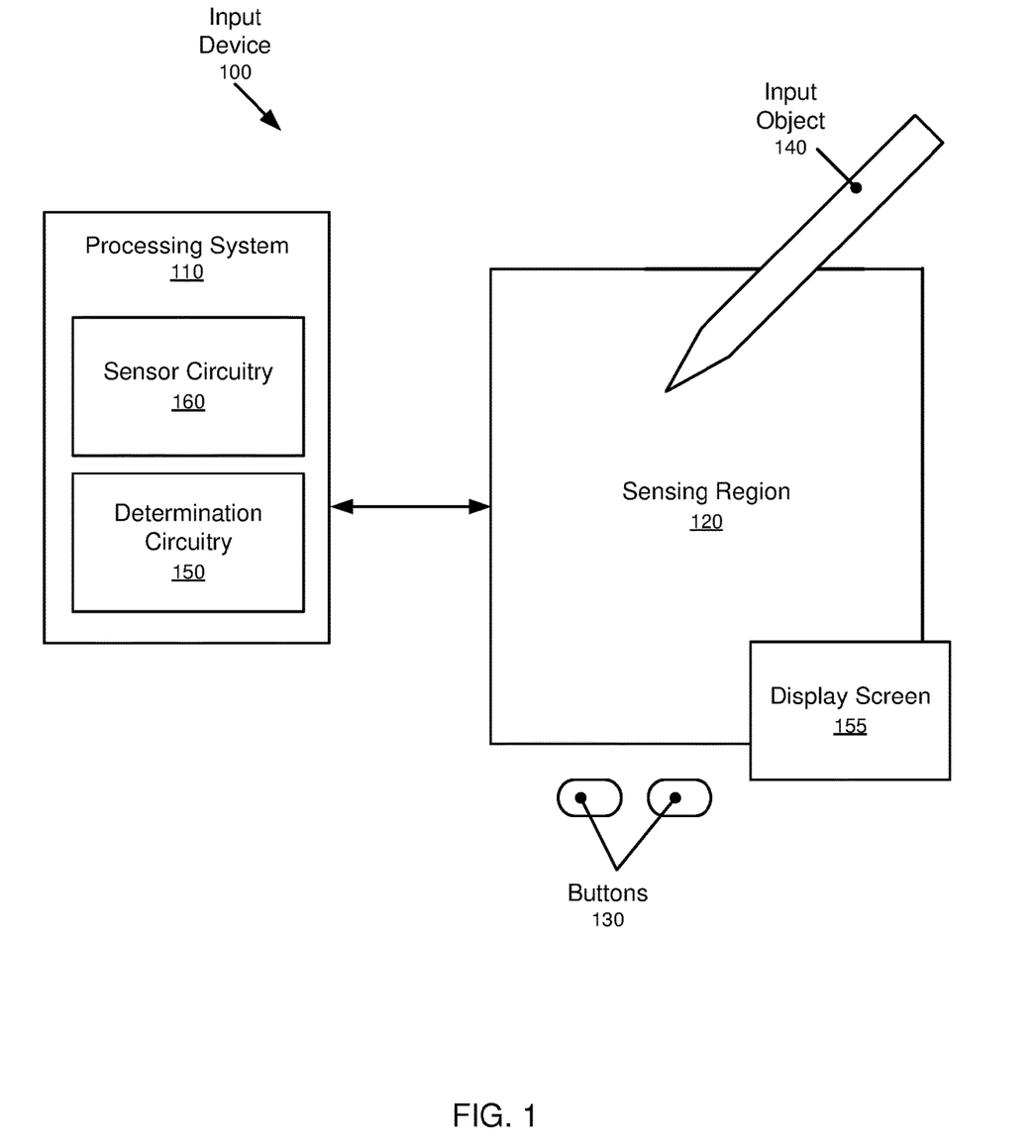
FIG. 1 shows a block diagram of an input device in accordance with one or more embodiments.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. The input device (100) may also include one or more buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "transcapacitance"). Absolute capacitance sensing methods detect changes in the capacitive coupling between sensor electrodes and an input object. Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of the disclosure are capable of being distributed as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
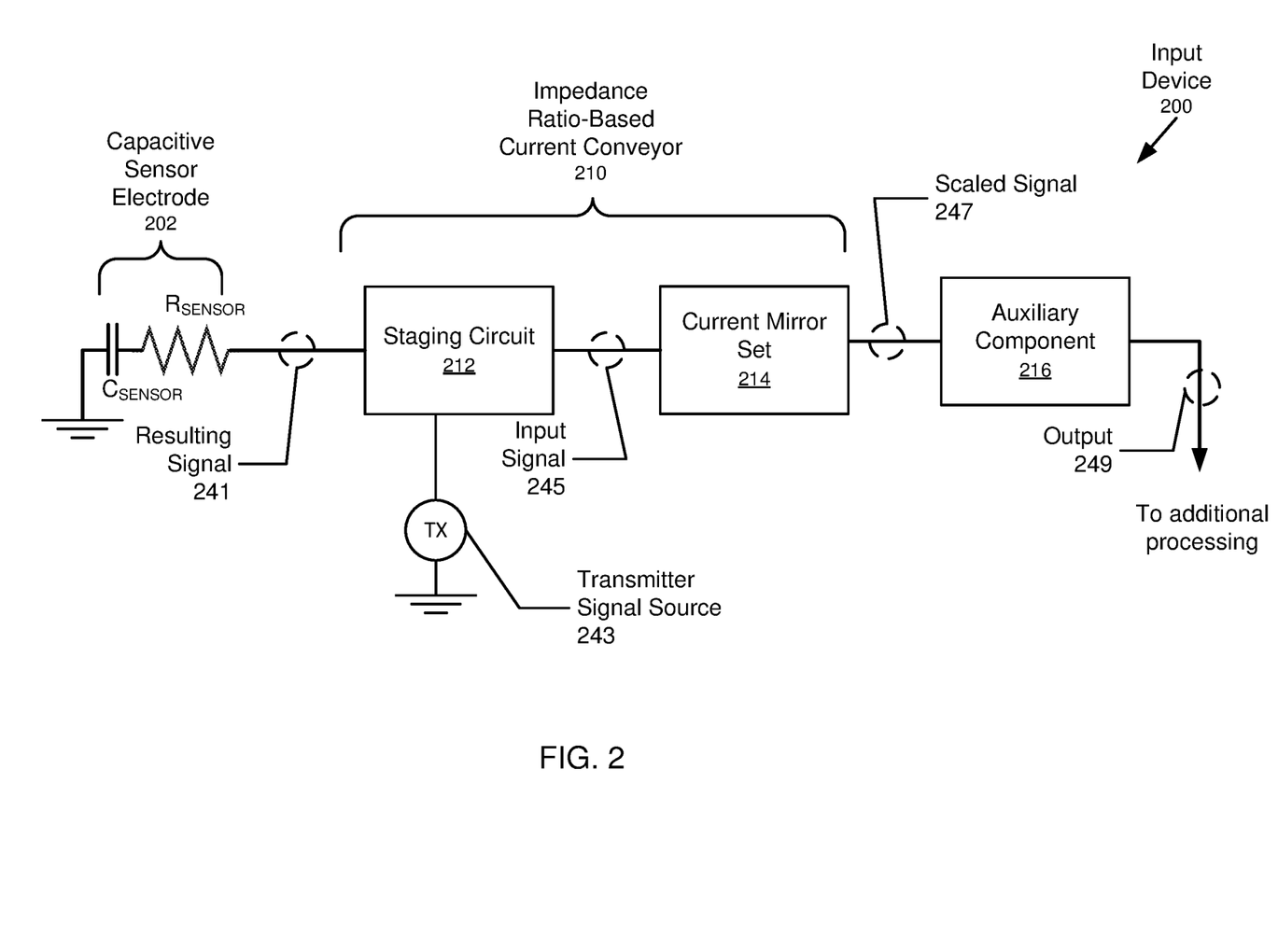
FIG. 2 show a block diagram of an input device with an impedance ratio-based current conveyor in accordance with one or more embodiments.

FIG. 2 shows an input device (200) in accordance with one or more embodiments. The input device (200) may correspond to input device (100), discussed above in reference to FIG. 1. As shown in FIG. 2, the input device (200) includes an impedance ratio-based current conveyor (210) and an auxiliary component (216). Further, the impedance ratio-based current conveyor (210) may include a staging circuit (212) and a current mirror set (214). One or more of these components (210, 216) may be part of the processing system (110) (e.g., sensor circuitry (160), determination circuitry (150)), discussed above in referenced to FIG. 1.

As shown in FIG. 2, the impedance ratio-based current conveyor (210) is coupled to at least one capacitive sensor electrode (202) associated with the sensing region (120), discussed above in reference to FIG. 1. The capacitive sensor electrode (202) may be modeled using a capacitor ($C_{SENSOR}$) and a resistor ($R_{SENSOR}$). As also shown in FIG. 2, a resulting signal (241) propagates through the capacitive sensor electrode (202). The resulting signal may be a function of one or more of: (i) a transmitter signal (e.g., a square signal, a sinusoidal signal, etc.) from a transmitter signal source (243); (ii) user input, if any, in the sensing region (120); (iii) interference, if any, from one or more sources (e.g., large background capacitance); and (iv) one or more circuit elements of the staging circuit (212)).

In the circuit configuration shown in FIG. 2, the capacitor sensor electrode (202) is performing absolute capacitance sensing (discussed above). In other embodiments, the circuit configuration may be modified (discussed below) such that the capacitor sensor electrode (202) is performing transcapacitance sensing (discussed above).

In one or more embodiments, the staging circuit (212) is configured to generate an input signal (245) based on (e.g., using) the resulting signal (241) and a ratio of two impedances (not shown) that are internal to the staging circuit (212). The input signal (245) has a current that is smaller (e.g., 1/10) than the current in the resulting signal (241). Accordingly, any interference in the resulting signal (241) may be attenuated in the input signal (245).

Although not shown in FIG. 2, auxiliary circuitry (e.g., coarse baseline correction (CBC) circuitry, etc.) may be used to offset (e.g., cancel, reduce) interference in the input signal (245). As this auxiliary circuitry is not operating on the resulting signal (241), but rather the smaller input signal (245) with attenuated interference, less CBC is required to successfully offset the interference, and thus less device noise is generated by the auxiliary circuitry.

In one or more embodiments, the current mirror set (214) includes one or more current mirrors that generate a scaled signal (247). The scaled signal (247) is a scaled version of the input signal (245) (e.g., a product of the input signal (245) with a scaling factor). The scaling factor may take on any value. For example, if the input device (200) is involved with fingerprint sensing (discussed below), the scaling factor may equal or approximately equal 1 (i.e., unity). As another example, if the input device (200) is involved with regular capacitive sensing, the scaling factor may equal or approximately equal 10.

In one or more embodiments, the input device (200) includes an auxiliary component (216). The auxiliary component (216) is driven by the scaled signal (247). For example, the auxiliary component (216) may include a mixer and/or an analog to digital converter (ADC). Additionally or alternatively, the auxiliary component (216) may include an analog filter and/or a charge integrator. The output (249) of the auxiliary component (216), either by itself or following additional processing, may be used to determine the presence of an input object in the sensing region (100). Additionally or alternatively, the output (249) may be used to perform fingerprint sensing.

Although FIG. 2 only shows a single capacitive sensor electrode (202) and a single impedance ratio-based current conveyor (210), in one or more embodiments, the input device (200) may have any number of capacitive sensor electrodes coupled to any number of impedance ratio-based current conveyors. Moreover, a single transmitter signal source (243) may be coupled to multiple impedance ratio-based current conveyors.

Figure 3A:
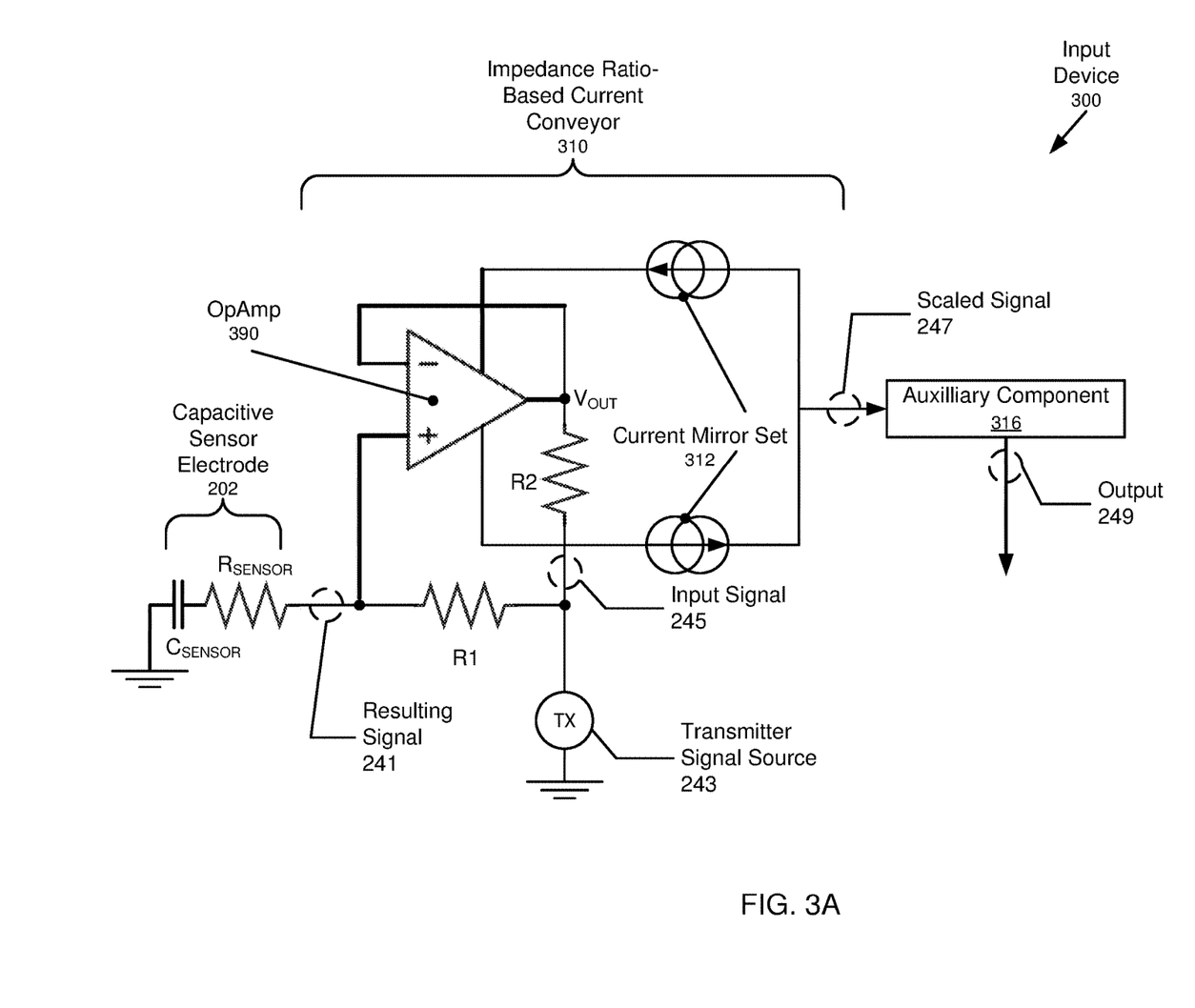
FIG. 3A and FIG. 3B show block diagrams of impedance ratio-based current conveyors in accordance with one or more embodiments.

FIG. 3A shows an input device (300) in accordance with one or more embodiments. The input device (300) may correspond to input device (200), discussed above in reference to FIG. 2. As shown in FIG. 3A, the input device (300) includes an impedance ratio-based current conveyor (310) coupled to an auxiliary component (316) and a capacitive sensor electrode (202) associated with the sensing region (120), discussed above in reference to FIG. 1. Moreover, one or more of these components (310, 316) may be part of the processing system (110) (e.g., sensor circuitry (160), determination circuitry (150)), discussed above in referenced to FIG. 1. In FIG. 3A, the sensor electrode (202) is configured to perform absolute capacitance sensing.

As shown in FIG. 3A, the impedance ratio-based current conveyor (310) includes a current mirror set (312). The current mirror set (312) is an example of the current mirror set (212), discussed above in reference to FIG. 2. The current mirror set (312) generates the scaled signal (247), which is a scaled version of the input signal (245).

As also shown in FIG. 3A, the impedance ratio-based current conveyor (310) includes an operational amplifier (390) and multiple impedances (R1, R2). The operation amplifier (390) and the multiple impedances (R1, R2) are an implementation example of the staging circuit (212), discussed above in reference to FIG. 2. Although in FIG. 3A the impedances are shown to be only resistors (R1, R2), in one or more embodiments, the impedances may include capacitors in series and/or in parallel with the resistors.

In one or more embodiments, the resulting signal (241) propagates through R1 and the capacitive sensor electrode (202) (modeled as a capacitor $C_{SENSOR}$ in series with a resistor $R_{SENSOR}$). Accordingly, the resulting signal (241) is a function of one or more of: (i) a transmitter signal (e.g., a square signal, a sinusoidal signal, etc.) from the transmitter signal source (243); (ii) user input, if any, in the sensing region (120); (iii) interference, if any, from one or more sources (e.g., large background capacitance); and (iv) R1.

As shown in FIG. 3A, the non-inverting input of the operational amplifier (390) is connected to both R1 and the capacitive sensor electrode (202). The inverting input of the operational amplifier (390) is connected to the output of the operational amplifier (390) ($V_{OUT}$), which in turn is connected to R2. The input signal (245) propagates through R2. The transmitter signal source (243) is connected to both R1 and R2.

Those skilled in the art, having the benefit of this detailed description, will appreciate that due to the electrical properties of the operational amplifier (390) and the circuit configuration shown in FIG. 3A, |input signal (245)|=|the resulting signal (241)|×R1/R2. In other words, the input signal (245) is based on (e.g., using) at least the resulting signal (241) and the ratio of R1 to R2.

In one or more embodiments, R1/R2 may be less than 1. For example, R1/R2=0.1. As a result, the input signal (245) is smaller than the resulting signal (241). Accordingly, any interference in the resulting signal (241) (e.g., interference that is present because of large background capacitance) may be attenuated in the input signal (245). By utilizing the staging circuit, less current needs to be conveyed to other (e.g., subsequent) processing stages (e.g., current mirror set (314), auxiliary component (316), etc.). This is turn allows the electrical components in these other (e.g., subsequent) processing stages to maintain linearity (i.e., operate in linear operating regions).

Although not shown in FIG. 3A, auxiliary circuitry (e.g., coarse baseline correction (CBC) circuitry, etc.) may be used to offset (e.g., cancel, reduce) interference in the input signal (245). This auxiliary circuitry may be connected to the output of the operational amplifier (390) ($V_{OUT}$). As this auxiliary circuitry is not operating on the resulting signal (241), but rather the smaller input signal (245) with attenuated interference, less CBC is required to successfully offset the interference, and thus less device noise is generated by the auxiliary circuitry. Additionally or alternatively, the auxiliary circuitry may be connected to the output of the current mirror set (312). In such embodiments, the auxiliary circuitry may be used to offset interference (e.g., interference that is present because of large background capacitance) in the scaled signal (247).

Figure 3B:
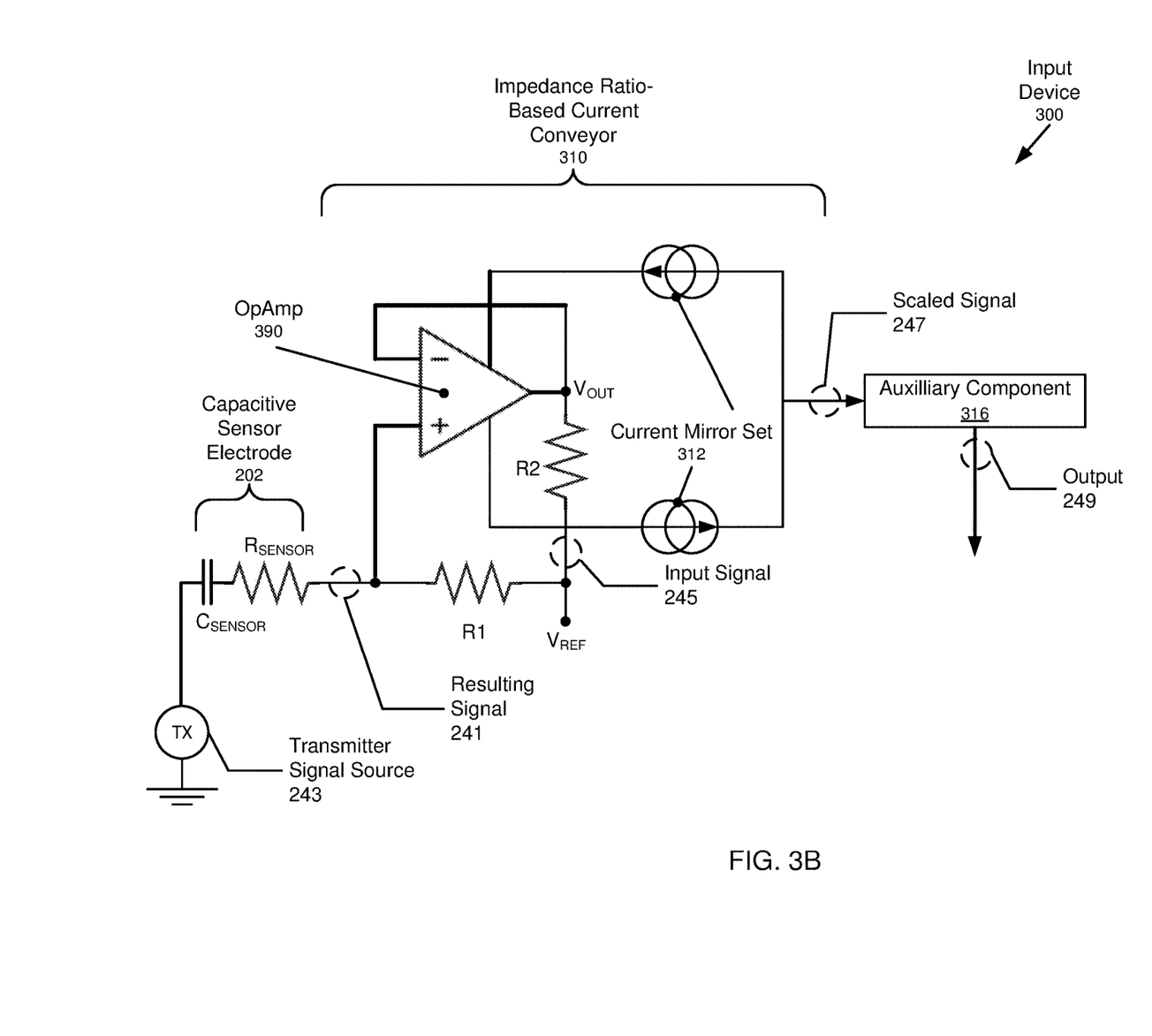

FIG. 3B shows the input device (300) in accordance with one or more embodiments. FIG. 3B is essentially the same as FIG. 3A, except that the transmitter signal source (243) is connected to $C_{SENSOR}$ of the sensor electrode (202) and that a reference voltage ($V_{REF}$) is connected to both R1 and R2. The configuration in FIG. 3B enables the sensor electrode (202) to perform transcapacitance sensing.

Figure 4:
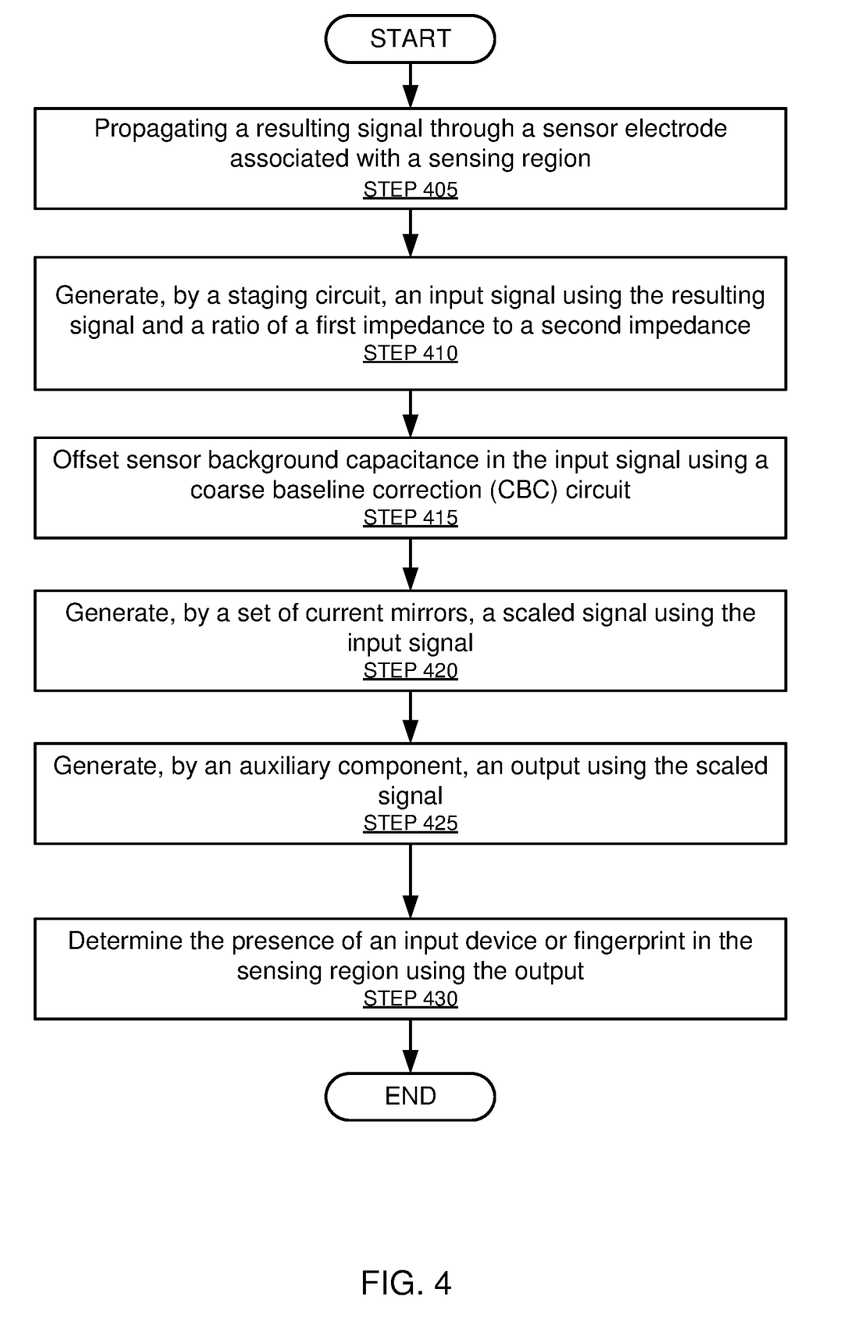
FIG. 4 shows a flowchart in accordance with one or more embodiments.

FIG. 4 shows a flowchart in accordance with one or more embodiments. The flowchart of FIG. 4 depicts a method for operating an input device associated with a sensing region. One or more of the steps in FIG. 4 may be performed by the components of the input device (200) and/or input device (300), discussed above in reference to FIG. 2, FIG. 3A, and FIG. 3B. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a resulting signal is propagated though a sensor electrode associated with a sensing region (STEP 405). The sensor electrode may be one of multiple sensor electrodes executing absolute capacitance sensing or transcapacitance sensing. The sensor electrode is coupled to a staging circuit of a impedance ratio-based current conveyor. Accordingly, the resulting signal is a function of one or more of: (i) a transmitter signal (e.g., a square signal, a sinusoidal signal, etc.) from a transmitter signal source; (ii) user input, if any, in the sensing region; (iii) interference, if any, from one or more sources (e.g., large background capacitance); and (iv) one or more electrical components (e.g., resistors) in the staging circuit.

In STEP 410, an input signal is generated based on (e.g., using) the resulting signal and a ratio of impedances (e.g., R1/R2) located in the staging circuit. This input signal is generated by the staging circuit and may be smaller than the resulting signal. For example, the input signal may be 1/10 the current of the resulting signal. Accordingly, any interference in the resulting signal (e.g., interference that is present because of large background capacitance) may be attenuated in the input signal.

In STEP 415, an auxiliary circuitry is used to offset sensor background capacitance in the input signal. As this auxiliary circuitry is not operating on the large resulting signal, but rather the smaller input signal with attenuated interference, less CBC is required to successfully offset the interference, and thus less device noise is generated by the auxiliary circuitry.

In STEP 420, a scaled signal is generated based on (e.g., using) the input signal. The scaled signal may be generated by a current mirror set of the impedance ratio-based current conveyor. The scaled signal may effectively be the product of the input signal with a scaling factor. The scaling factor may take on any value. If the input device is involved with fingerprint sensing (discussed below), the scaling factor may equal or approximately equal 1 (i.e., unity). If the input device is involved with regular capacitive sensing, the scaling factor may equal or approximately equal 10.

In STEP 425, an output is generated based on (e.g., using) the scaled signal. The output is generated by an auxiliary component (e.g., a mixer, an ADC, a filter, etc.). In STEP 430, the presence of an input object and/or fingerprint is determined. Determining the presence of an input object and/or fingerprint in the sensing region may trigger the input device to execute one or more tasks and/or provide one or more reports.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device associated with a sensing region, comprising:
    a first sensor electrode associated with the sensing region and configured to propagate a resulting signal;
    a first auxiliary component configured to generate an output using a scaled signal; and a first impedance ratio-based current conveyor coupled to the first sensor electrode and comprising:
  a staging circuit configured to generate an input signal using the resulting signal and a ratio of a first impedance to a second impedance, wherein the ratio of the first impedance to the second impedance establishes a gain applied to the resulting signal when generating the input signal; and
  a set of current mirrors configured to generate the scaled signal from the input signal.

2. The input device of claim 1, wherein the ratio is less than 1 to attenuate interference in the resulting signal.

3. The input device of claim 1, wherein the first impedance comprises a first resistor, wherein the second impedance comprises a second resistor, and wherein the staging circuit comprises:
  an operational amplifier comprising:
    an output connected to the second resistor, wherein the input signal propagates through the second resistor;
    a non-inverting input connected to the sensor electrode and to the first resistor, wherein the resulting signal propagates through the first resistor; and
    an inverting input connected to the output.

4. The input device of claim 3, further comprising:
  a transmitter signal source connected to the first resistor and the second resistor, wherein the sensor electrode is configured to perform absolute capacitance.

5. The input device of claim 3, further comprising:
  a transmitter signal source connected to the sensor electrode; and
  a reference voltage connected to the first resistor and the second resistor,
  wherein the sensor electrode is configured to perform transcapacitance sensing.

6. The input device of claim 3, further comprising:
  a second sensor electrode associated with the sensing region;
  a second auxiliary component;
  a second impedance ratio-based current conveyor coupled to the second sensor electrode and the second auxiliary component; and
  a transmitter signal source connected to both the first impedance ratio-based current conveyor and the second impedance ratio-based current conveyor.

7. The input device of claim 3, further comprising:
  a coarse baseline correction (CBC) circuit connected to the output of the operational amplifier and configured to offset sensor background capacitance in the input signal.

8. The input device of claim 3, further comprising:
  a coarse baseline correction (CBC) circuit connected to an output of the set of current mirrors and configured to offset sensor background capacitance in the scaled signal.

9. The input device of claim 1, further comprising:
  a processing module configured to perform fingerprint sensing using on the output,
  wherein the auxiliary component comprises at least one selected from the group consisting of a mixer and an analog to digital converter (ADC).

10. A method for operating an input device associated with a sensing region, comprising:
  propagating, through a sensor electrode associated with the sensing region, a resulting signal;
  generating, by a staging circuit of an impedance ratio-based current conveyor, an input signal using the resulting signal and a ratio of a first impedance to a second impedance wherein the ratio of the first impedance to the second impedance establishes a gain applied to the resulting signal when generating the input signal;
  generating, by a set of current mirrors of the impedance ratio-based current conveyor, a scaled signal using the input signal; and
  generating, by an auxiliary component, an output using the scaled signal.

11. The method of claim 10, wherein the ratio is less than 1, wherein the first impedance comprises a first resistor, wherein the second impedance comprises a second resistor, and wherein the staging circuit comprises:
  an operational amplifier comprising:
    an output connected to the second resistor, wherein the input signal propagates through the second resistor;
    a non-inverting input connected to the sensor electrode and to the first resistor, wherein the resulting signal propagates through the first resistor; and
    an inverting input connected to the output.

12. The method of claim 11, wherein the resulting signal is associated with a transmitter signal source coupled to the sensor electrode, wherein the first resistor and the second resistor are connected to a reference voltage, and wherein the sensor electrode is configured to perform transcapacitance sensing.

13. The method of claim 11, further comprising:
  offsetting, using a coarse baseline correction (CBC) circuit connected to the output of the operational amplifier, sensor background capacitance in the input signal.

14. The method of claim 11, further comprising:
  offsetting, using a coarse baseline correction (CBC) circuit connected to an output of the set of current mirrors, sensor background capacitance in the scaled signal.

15. The method of claim 11, further comprising:
  executing fingerprint sensing using the output,
  wherein the auxiliary component comprises at least one selected from the group consisting of a mixer and an analog to digital converter (ADC).

16. A processing system for an input device associated with a sensing region, comprising:
  a sensor circuitry configured to:
    propagate, through a sensor electrode associated with the sensing region, a resulting signal;
    generate, by a staging circuit of an impedance ratio-based current conveyor, an input signal using the resulting signal and a ratio of a first impedance to a second impedance, wherein the ratio of the first impedance to the second impedance establishes a gain applied to the resulting signal when generating the input signal;
    generate, by a set of current mirrors of the impedance ratio-based current conveyor, a scaled signal using the input signal; and
    generate, by an auxiliary component, an output using the scaled signal; and
  a determination circuitry configured to:
    determine a presence of an input object in the sensing region using the output.

17. The processing system of claim 16, wherein the first impedance comprises a first resistor, wherein the second impedance comprises a second resistor, and wherein the staging circuit comprises:
  an operational amplifier comprising:
    an output connected to the second resistor, wherein the input signal propagates through the second resistor;

a non-inverting input connected to the sensor electrode and to the first resistor, wherein the resulting signal propagates through the first resistor; and an inverting input connected to the output.

18. The processing system of claim 17, the sensor circuitry further comprising:

a coarse baseline correction (CBC) circuit connected to the output of the operational amplifier and configured to offset sensor background capacitance in the input signal.

19. The processing system of claim 17, the sensor circuitry further comprising:

a coarse baseline correction (CBC) circuit connected to an output of the set of current mirrors and configured to offset sensor background capacitance in the scaled signal.

20. The processing system of claim 17, wherein the resulting signal is associated with a transmitter signal source coupled to the sensor electrode, wherein the first resistor and the second resistor are connected to the transmitter signal source, and wherein the sensor electrode is configured to perform absolute capacitance sensing.

* * * * *

UNITED STATES PATENT AND TRADEMARK OFFICE
CERTIFICATE OF CORRECTION

| | | |
|---|---|---|
| PATENT NO. | : 10,540,042 B2 | Page 1 of 1 |
| APPLICATION NO. | : 15/729496 | |
| DATED | : January 21, 2020 | |
| INVENTOR(S) | : Eric Bohannon | |

It is certified that error appears in the above-identified patent and that said Letters Patent is hereby corrected as shown below:

On the Title Page

Item (57) ABSTRACT, occurring on the fourth line, the word "an" should read -- a --.

Signed and Sealed this
Fifth Day of May, 2020

Andrei Iancu
*Director of the United States Patent and Trademark Office*